United States Patent [19]
Stroup, Sr. et al.

[11] Patent Number: 5,472,126
[45] Date of Patent: Dec. 5, 1995

[54] TUBE SLICING TECHNIQUE

[75] Inventors: Steven L. Stroup, Sr.; Steven L. Stroup, II, both of Fort Wayne, Ind.

[73] Assignee: Crown Unlimited Machine, Inc., Bluffton, Ind.

[21] Appl. No.: 161,428

[22] Filed: Dec. 16, 1993

[51] Int. Cl.⁶ ........................................................ A26F 3/00
[52] U.S. Cl. ............................ 225/2; 225/96.5; 225/101; 29/33 T; 29/413; 29/890.053
[58] Field of Search ................................ 225/2, 96, 96.5, 225/101, 103, 104, 105; 83/879, 880, 885, 887; 29/413, 414, 417, 890.05, 890.053 726, DIG. 33, 33 T, 415, 564, 564.7

[56] References Cited

U.S. PATENT DOCUMENTS

| | | | |
|---|---|---|---|
| 3,517,576 | 6/1970 | Hilty et al. | 83/887 X |
| 3,568,488 | 3/1971 | Franks . | |
| 3,692,219 | 9/1972 | Franks | 225/2 |
| 4,112,294 | 9/1978 | Pressiat . | |
| 4,235,137 | 11/1980 | Harman | 82/73 |
| 4,517,872 | 5/1985 | Dontscheff | 83/887 X |
| 5,027,515 | 7/1991 | Murdock | 83/885 X |
| 5,133,492 | 7/1992 | Wohrstein et al. | 225/2 |
| 5,143,268 | 9/1992 | Stroup, Jr. | 225/2 |

FOREIGN PATENT DOCUMENTS

| | | | |
|---|---|---|---|
| 0198798 | 8/1990 | Japan | 225/2 |

*Primary Examiner*—Eugenia Jones
*Attorney, Agent, or Firm*—Pearne, Gordon, McCoy & Granger

[57] ABSTRACT

Method and apparatus is disclosed for severing flat tubing. A length of tubing is gripped at longitudinally spaced apart locations and the tubing is deeply scored by rapidly rotating circular cutters which are moved across the faces of the tubing at a predetermined linear velocity. The angular velocity of the circular cutters greatly exceeds the linear velocity of traversal. An axial force is applied to separate the tubing.

2 Claims, 9 Drawing Sheets

TUBE SLICING TECHNIQUE

BACKGROUND OF THE INVENTION

This invention relates to tube cutting devices and techniques and, more particularly, to a method and apparatus for separating flat heat exchanger tubing into predetermined lengths having substantially burr-free parted ends.

Conventional heat exchanger tubing is fabricated from cylindrical, thin-walled copper pipe, which is bent into a serpentine pattern and provided with heat exchanging fins. It has long been recognized that care must be taken in cutting the tubing to minimize the formation of radially inwardly projecting burrs which are formed by the cutting tools. Typically, the tubing is cut by orbiting a cutting tool about the circumference of the tubing while moving the cutter inwardly.

Various mechanisms have been proposed to minimize the formation of burrs on such tubing. One such device is disclosed in U.S. Pat. No. 3,568,488 to Franks. According to the Franks patent, a tube is tightly gripped and placed under tension, and while the tube is tensioned, a cutting tool makes an annular cut in the periphery of the tube which penetrates into the wall of the tube. With the tension applied to the tube, the tensile strength of the tube wall not yet severed is exceeded, and the tube breaks. Consequently, the tube material is not cut entirely through, but partially cut and partially pulled apart at the cutting point. Therefore, the inwardly extending burr is minimized by the extruding caused by the pulling apart action. Other examples of tube cutting techniques may be found in U.S. Pat. Nos. 4,235, 137; 4,112,294; and 3,692,219.

A recent development in heat exchanged tubing involves the provision of extruded flat tubing made from aluminum. The flat tubing has flat, parallel faces and rounded ends to define a flat, narrow interior channel. The interior channel is separated into a plurality of axially extending internal chambers defined by parallel walls extending perpendicularly between the flat walls of the tube. This arrangement provides a large surface area to the liquid flowing through the tube. Since the walls defining the internal chambers are so closely spaced, it is imperative that the severed ends of the tubing be substantially burr-free so that the burrs do not block the passages and do not interfere with an edge-to-edge tube joining operation or other operation involving the connection of the tube to a fluid source.

An improved tube parting technique has been developed to accommodate the dimensions and shape of the flat tubing which separates the tubing in such a manner that the separated end of the tubing is substantially burr-free. This improvement is set forth in U.S. Pat. No. 5,143,268, granted to Steven L. Stroup, Jr. According to the Stroup, Jr. patent, a length of flat metal tubing is clamped at spaced apart locations by gripping devices. Circular cutting or scoring blades deeply score lines of equal depth on opposite faces of the tubing with each line being in a plane normal to a longitudinal axis of the tubing. The scored lines do not penetrate the entire thickness of the flat tubing walls. A high impact force is imparted along the longitudinal axis of the tubing by sharply striking one of the gripping devices with a high impact force. The magnitude of the force is sufficient to separate the flat, parallel faces of the tubing at the score line and to separate the internal parallel walls and the rounded ends. The sudden impact fractures the tubing along the scored line without any substantial elongation or cold flow of the metal to thereby eliminate, or substantially reduce, burrs and necking down of the tubing.

Another technique for separating thin-walled multi-port extrusion tubing is set forth in U.S. Pat. No. 5,133,492, granted to Wohrstein et al. According to the Wohrstein et al. patent, a length of tubing is clamped between upper and lower clamping members. The upper and lower clamping members include straight edged knife blades which are forced into the upper and lower walls of the tubing to a depth which is slightly less than the thickness of the upper and lower walls. The tubing is parted by drawing a first portion of the partially severed tubing away from a second portion of the tubing in a direction perpendicular to the grooves formed by the cutting blades. According to the patentees, the elongation characteristics of the metal is such that the metal necks down into a bell shape to minimize interference with the cross-sectional opening of the tubing.

One problem associated with the technique described in the Stroup, Jr. patent is the effect of the upper and lower circular cutting or scoring blades on the cross-section of the tubing as the line is being scored. The circular cutting blades are moved relative to the tubing at a predetermined linear velocity in a direction generally parallel to the flat upper and lower walls and transverse to a longitudinal axis of the tubing. Since the circular cutting blades are rotatably mounted, the cutting periphery of the blade moves at an angular velocity substantially corresponding to the linear velocity at which the blade is moved. The rotatably mounted circular cutting blade has an effective cutting area which comprises the arc of the circle defined by the cutting blade as it engages the tubing wall. The length of this arc is extremely small and, therefore, significant inward force is exerted on the tubing by the cutters. As a result, care must be taken to avoid total severance of the flat walls since such severance would result in inwardly directed burrs. On the other hand, even when the walls are not completely severed, the walls tend to be crushed to thereby reduce the effective cross-section of the tube passages.

Similarly, in accordance with the teachings of Wohrstein et al., all of the cutting force is directed perpendicular to the faces of the extrusion, and inward deformation of the tubing is substantially unavoidable. Furthermore, since one aspect of the Wohrstein et al. technique relies upon the cutting blades to restrain the tube during the drawing process, the blades must have a thickness which is sufficient to resist the shear stresses imposed on the blades by the drawing operation. Since the thickness of the blades must be increased to provide resistance to shear, the metal displaced by the blades must necessarily tend to be displaced into the tube opening.

A greatly improved method and apparatus is disclosed in co-pending application Ser. No. 07/998,421, filed Dec. 30, 1992. In that application, a method and apparatus for separating thin-walled flat metal tubing are disclosed. The tubing is partially severed by providing relative movement between the tubing and opposed cutting blades having straight cutting edges. The relative movement is transverse to the longitudinal axis of the tubing, and the straight cutting edges of the blades form a small acute angle with respect to the flat faces of the tubing. The tubing is completely severed by applying axial force to the tubing. The small acute angle exhibits a correspondingly small resultant force by the blades into the flat faces of the tubing resulting in little, if any, burrs at the severed end of the tubing.

SUMMARY OF THE INVENTION

This invention provides method and apparatus for separating flat aluminum heat exchanger tubing by applying clamping pressure to the tubing at spaced apart locations and through cutting opposite parallel flat walls of the tubing transversely to the longitudinal axis of the tubing. The slicing blades according to this invention are circular and are similar to the blades disclosed in U.S. Pat. No. 5,143,268. The scoring blades in that patent are rotatable so that the cutting edges roll at an angular velocity corresponding to the linear speed at which the blades traverse and score the workpiece. As was indicated, such rolling action applies significant downward pressure on the face of the workpiece. According to the present invention, however, the circular cutting blades are rotatably powered so that the cutting edge of the blade has an angular velocity which exceeds the linear speed at which the blades traverse the workpiece. The rotary motion imparted to the blades produces a slicing action which does not solely rely upon a crushing force which is directed perpendicular to the faces of the tubing.

According to this invention, clamping pressure is applied to the tubing at spaced apart locations and axially spaced apart rotatably mounted co-planer slicing wheels are caused to traverse the flat faces of the tubing at a predetermined linear velocity. The wheels are spaced apart a distance which enables the slicing wheels to substantially or completely sever the flat walls of the tubing. During such traversal, the slicing wheels are rotationally powered so that the slicing edges of the blades travel at an angular velocity which exceeds the linear velocity of traversal. The direction of rotation of the slicing wheels is largely immaterial where the angular velocity greatly exceeds the linear cutting velocity. In a typical slicing operation, the velocity of traverse is approx 1 fp sec., and the angular velocity is approx 800 fp sec. The effectiveness of this slicing action may be appreciated if one considers the effectiveness of a rotary meat slicing blade on a piece of meat as the meat linearly traverses the blade compared to the ineffectiveness of a stationary blade in a similar operation.

After the opposed walls are severed, the tube is completely parted by applying an axial force to the tubing to exceed the ultimate strength of the unsevered tube sides and the plurality of internal parallel walls which define the axially extending internal chambers. According to a preferred aspect of this invention, the force applied to the tubing is a high impact force along the longitudinal axis of the tubing.

DETAILED DESCRIPTION OF THE DRAWINGS

Figure 1:
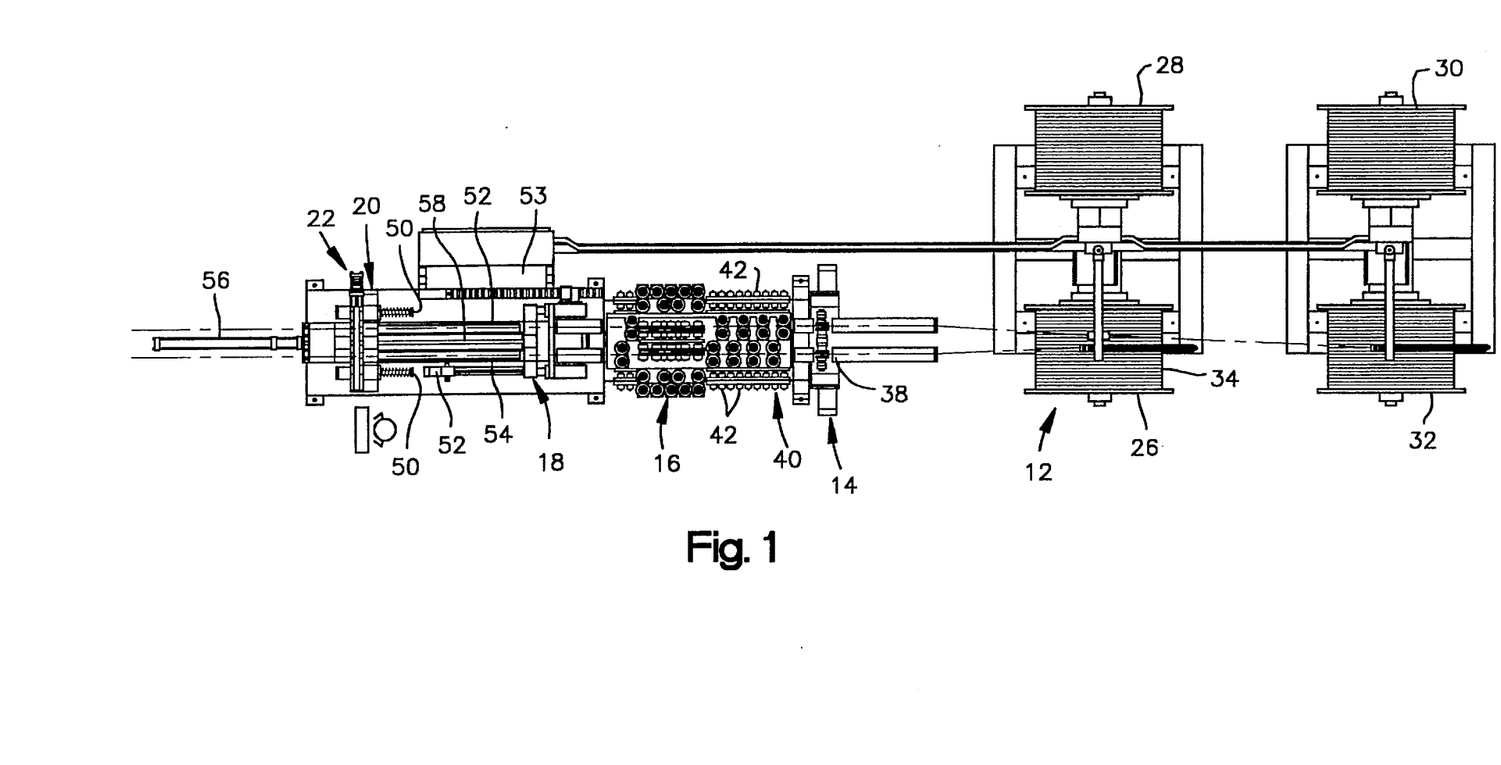
FIG. 1 is a plan view of a machine for separating lengths of flat metal tubing, according to this invention.
Figure 2:
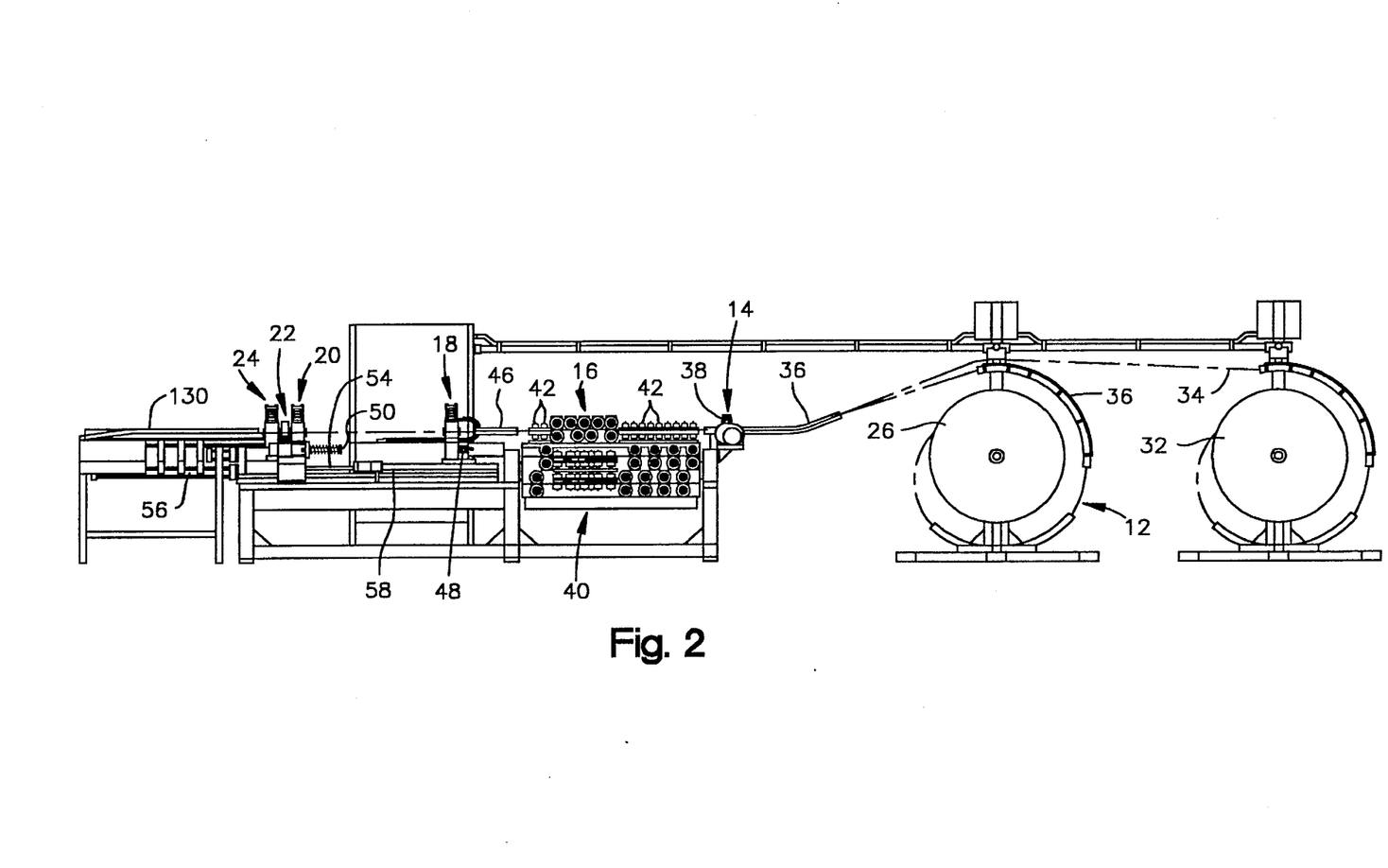
FIG. 2 is an elevational view of the machine illustrated in FIG. 1.

Referring now to the drawings, and particularly, to FIGS. 1 and 2, there is illustrated an apparatus 10 for separating an indeterminate length of flat metal tubing into predetermined lengths. The apparatus 10 includes a conventional uncoiler assembly 12 which uncoils the stock upon demand, a stock feed roll assembly 14, a straightening and sizing assembly 16, a clamping assembly 18 for incrementally feeding the stock, a clamping assembly 20 for stabilizing the stock during a cutting and parting operation, a cutter assembly 22, and a clamping assembly 24 for parting the stock by impact.

As may be noted, the stock uncoiler assembly includes spool mounts 26, 28, 30 and 32, having coiled flat tubing 34 wound thereon. The spool mounts 26 and 32 are in an active working position to feed tubing 34 to the powered feed station 14. The spool mounts 28 and 30 are in a standby, ready position.

The tubing 34 is fed through guide tubes 36 to the feed roller assembly 14 which includes feed rollers 38. From the feed rollers, the tubing 34 is laced through the straightening and sizing assembly 16. The straightening and sizing assembly 16 is a conventional device which includes a turret 40 having tooling fixtures or rollers 42 on each face so that the turret may be positioned to accommodate tubing of different widths and thicknesses. The tubing 34 is fed through a guide 46 to the clamping assembly 18 which is similar to the other clamping assemblies 20 and 24, and the clamping function of those assemblies will be described in greater detail.

The clamping assembly 18 is adapted to grip the tubing and advance a length of the tubing through the clamping assemblies 20 and 24 a distance which corresponds to the distance between adjustable stops 48 and 50. As will become apparent, the distance between the stops 48 and 50 corresponds to the desired axial extent of the tubing. A linear actuator 52 is preset to this desired length, and the linear actuator establishes the position of the stop 48 for accurate length control.

The clamping assembly 18 is mounted on guide rods 53 and 54, and the assembly 18 is reciprocated by a feed cylinder 56 having a piston rod 58 fixed to the assembly 18. Reciprocation of the assembly 18 toward the assembly 20, and with the assembly 18 in a clamped condition, the assembly 18 axially advances a pair of parallel tubing lengths through the assemblies 20 and 24 which are in an unclamped condition and through the interposed cutting assembly 22. When the assembly 18 is fully advanced against the stops 50, the clamp 18 is released and the assembly 18 is returned to its illustrated position. Prior to the release of the clamping assembly 18 and while the assembly 18 is against its stop 50, the clamping assemblies 20 and 24 are actuated to firmly grip the tubing 34. Since the assemblies 18, 20 and 24 are substantially identical, the assembly 20 will be described herein as representative of the other clamping assemblies.

Figure 4:
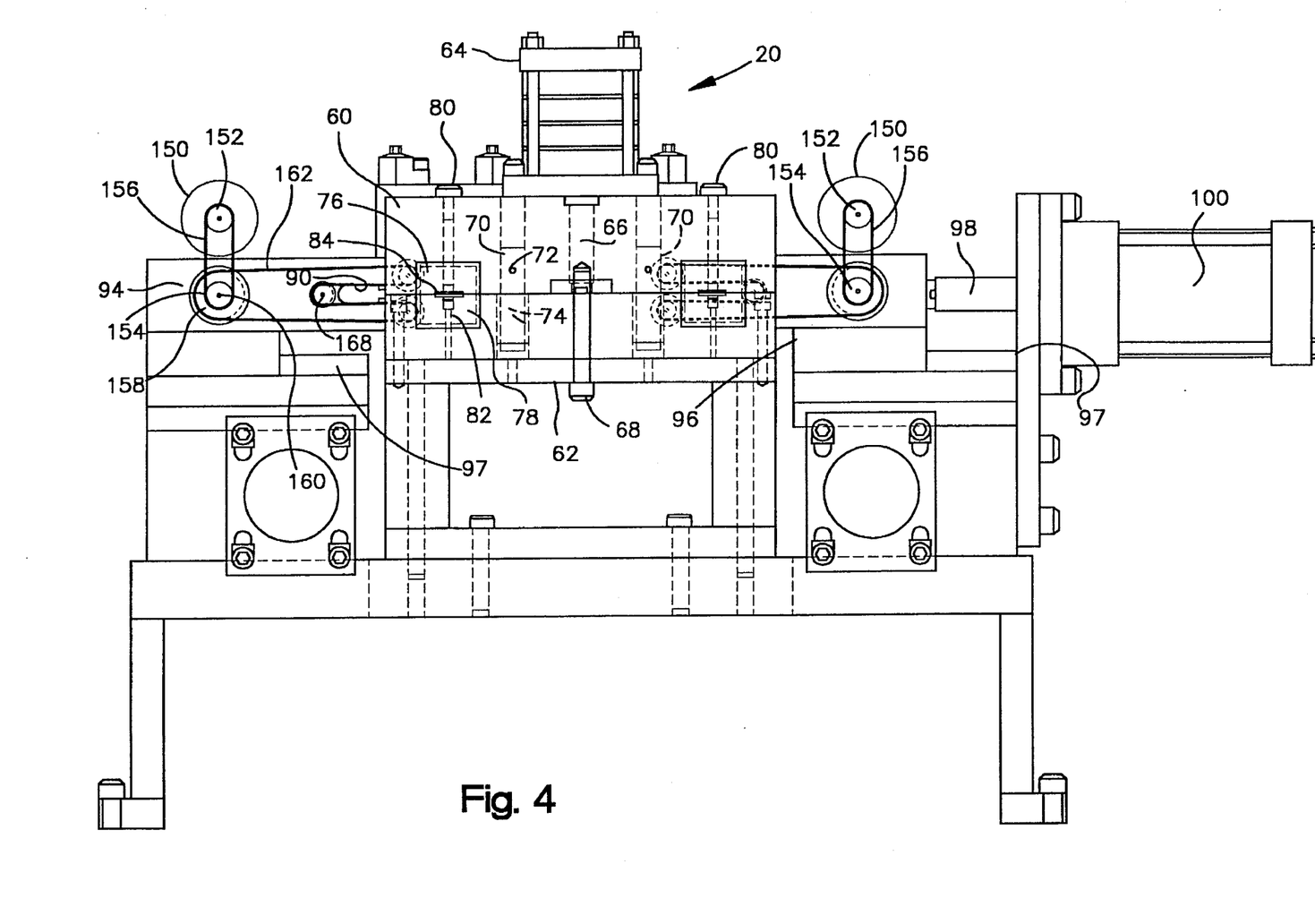
FIG. 4 is a cross-sectional view, the plane of the section being in ed by the line 4—4 in FIG. 3.

The clamping assembly 20 (FIG. 4) includes a fixed upper platen and a moveable lower platen 62. The upper platen 60 has a pneumatic powered cylinder 64 mounted thereon, and the cylinder 64 has a piston rod 66 slideably projecting through the platen 60. A fastening bolt 68 extends through the moveable platen 62 and into the rod 66 so that the moveable platen 62 may be released from its illustrated closed clamping position. During such movement, the lower platen 62 is guided by rods 70 fixed in the upper platen 60 by set screws 72 and received in guide bores 74 in the platen 62. The platens 60 and 62 are provided with upper and lower die sets 76 and 78, respectively. The upper die sets are retained by fasteners 80, and the lower die sets are fixed by fasteners 82. Each die set 76 and 78 cooperate to define a clamping opening 84 which has a cross-section corresponding to the cross-section of the tubing 34 to establish a slight interference with the tubing as the die sets 76 and 78 cooperate to clamp the tubing.

Figure 3:
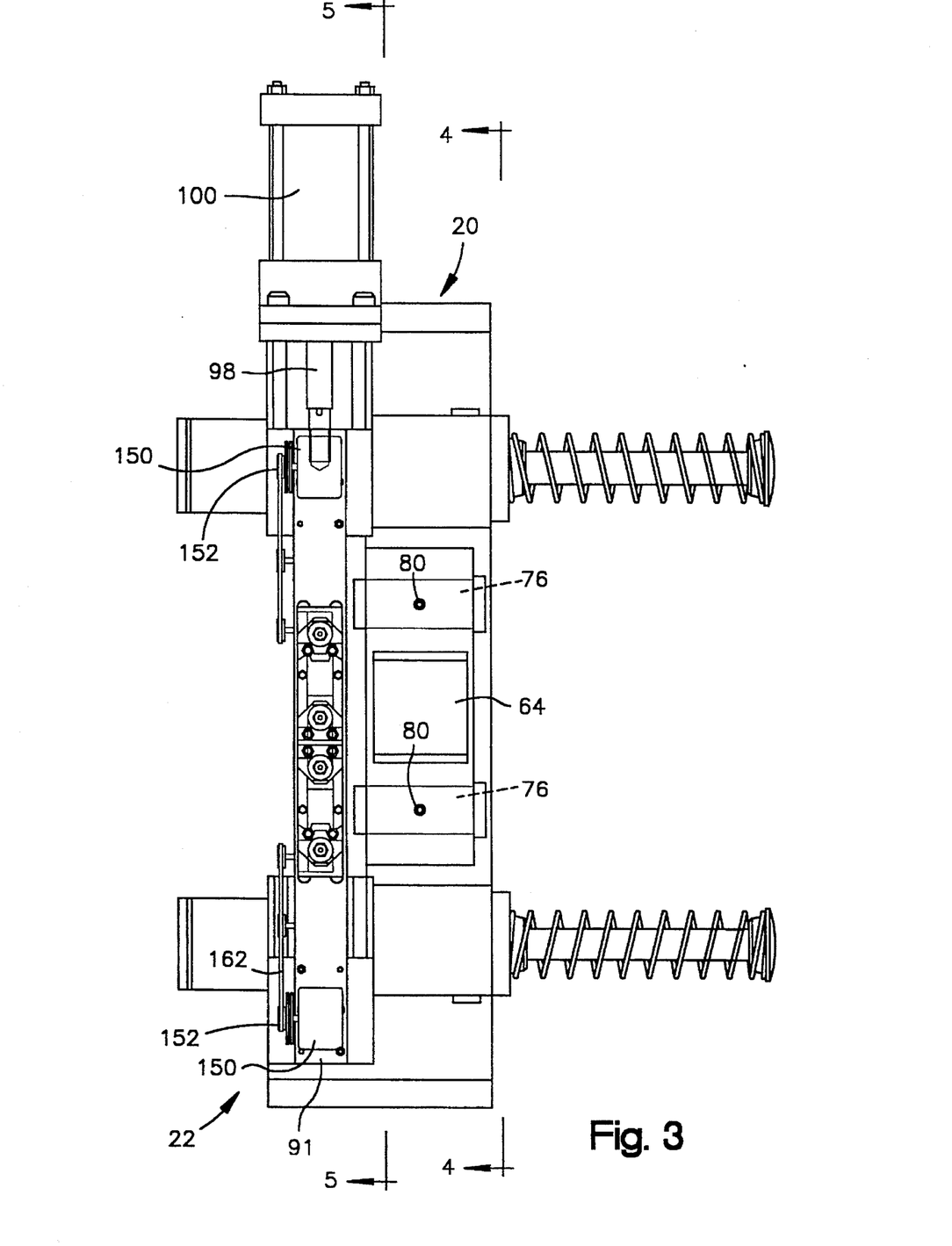
FIG. 3 is a plan view of the scoring head portion of the machine.
Figure 3A:
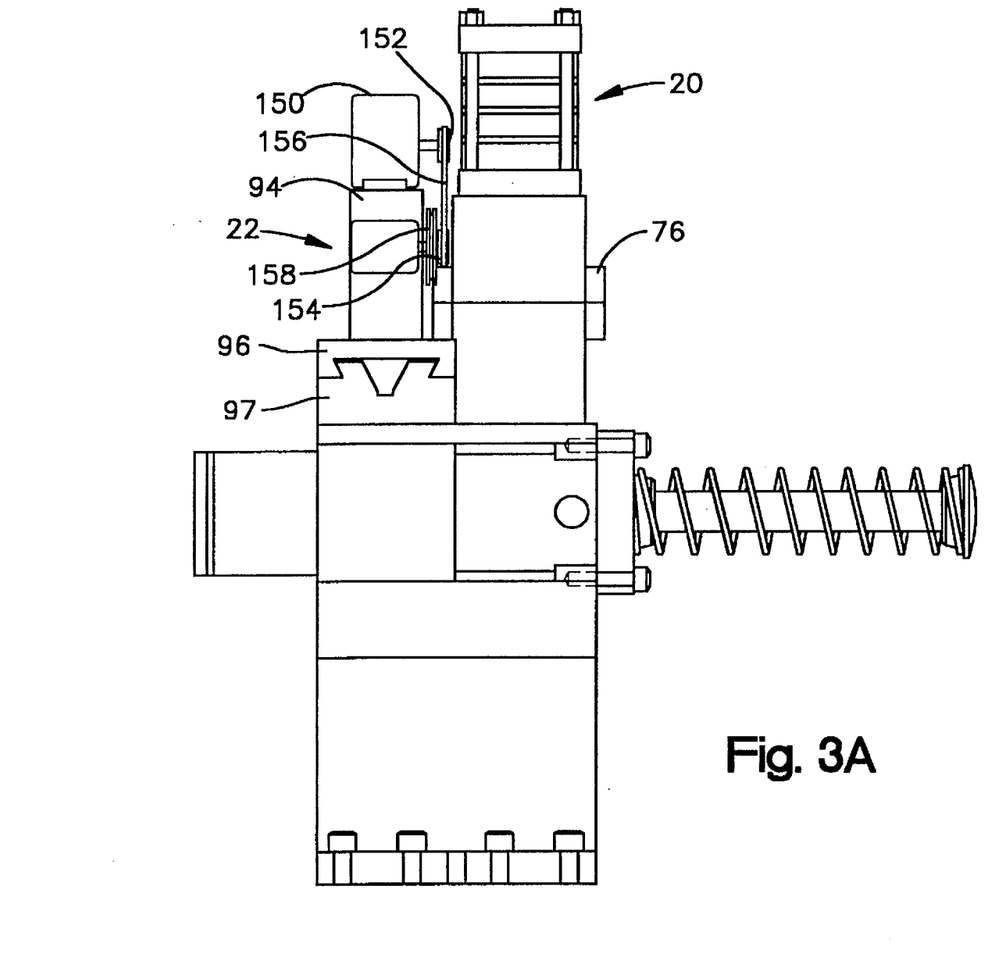
FIG. 3A is an elevational view of the portion illustrated in FIG. 3.

With the clamping assemblies 20 and 24 securely holding the length of the tubing advanced by the assembly 18, the tubing is partially severed by cutting according to the following procedure. The cutting assembly 22 is interposed between the assemblies 20 and 24 so that the tubing projects through elongated apertures 90 and 92 in a beam 94. The beam 94 is mounted on a guide block 96 which cooperates with a dovetail block 97. One end of the beam 94 is fixed to a piston rod 98 associated with a power cylinder 100 which is adapted to shift the position of the beam from its illustrated position to a position adjacent the cylinder 100.

Upper and lower circular slitting or scoring blades 102 and 104, respectively, are mounted on the beam 94 so that they project into the apertures 90 and 92. Each slitter 102 is rotatably mounted on a vertically adjustable yoke 105 so that the spacing between the slitters 102 and 104 may be adjusted by a threaded shaft 106.

The blades 102 and 104 are rotatably driven by motors 150 which are mounted at the ends of the beam 94. Each motor 150 has a drive shaft which carries a drive sprocket 152. Each drive sprocket 152 drives a driven sprocket 154 by a first endless chain 156. Each driven sprocket 154 is mounted on a stub shaft 160 which in turn is rotatably mounted on the beam 94. A sprocket 158 is mounted on each stub shaft 160 and by a second endless chain 162 drives a pair of sprockets 164 and 166 associated with the blades 102 and 104. An idler pulley 168 is interposed in the path of travel of the chain 162.

Figure 8:
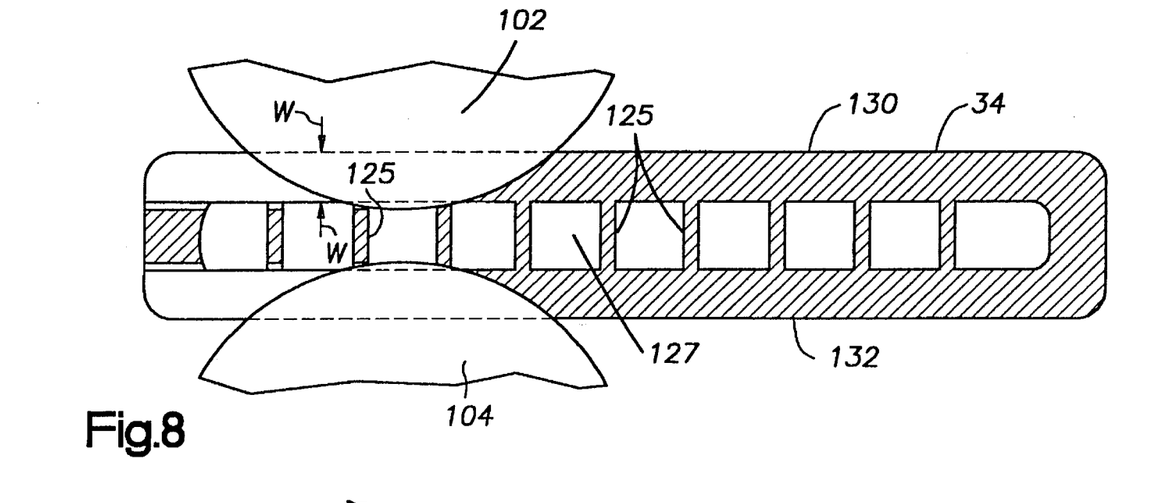
FIG. 8 is an enlarged elevational view of a pair of cutting blades illustrating the relationship between the cutting blades and the flat tubing during the cutting stroke of the blades.
Figure 9:
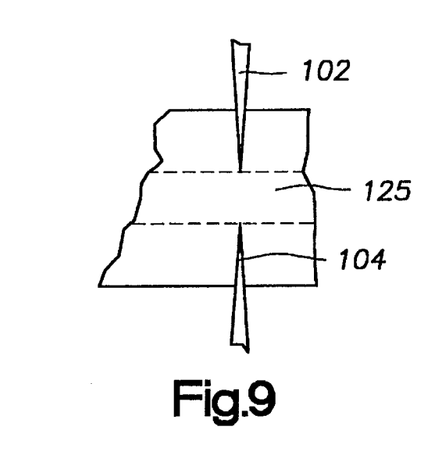
FIG. 9 is a cross-sectional view, the plane of the section being indicated by the line 9—9 in FIG. 8.

By shifting the beam 94 from its illustrated position to a position adjacent the power cylinder 100 at a predetermined linear velocity and by rotating the blades at a predetermined angular velocity which exceeds the linear velocity, the blades 102 and 104 slice through the upper and lower flat parallel walls 130 and 132 of the tubing 34. This slicing action completely severs the walls 130 and 132, but since the slicing blades 102 and 104 project only slightly beyond the thickness of the walls 130 and 132 and because of the rotation of the blades 102 and 104, the formation of inwardly directed burrs is minimized, if not entirely eliminated. Also, longitudinal partitioning walls 125 which define cooling passages 127 remain substantially uncut.

Figure 5:
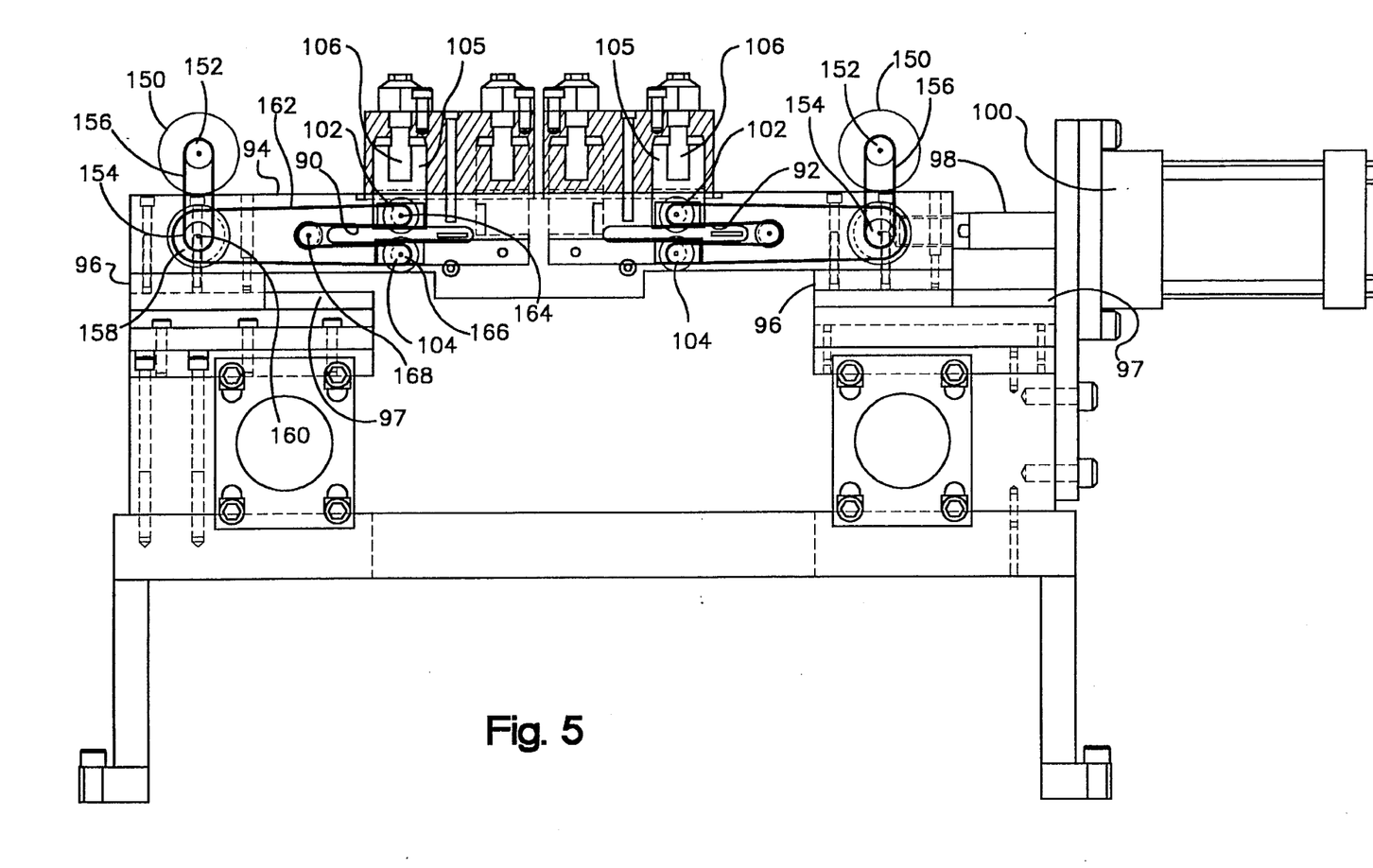
FIG. 5 is a cross-sectional view, the plane of the section being indicated by the line 4—4 in FIG. 3.
Figure 6:
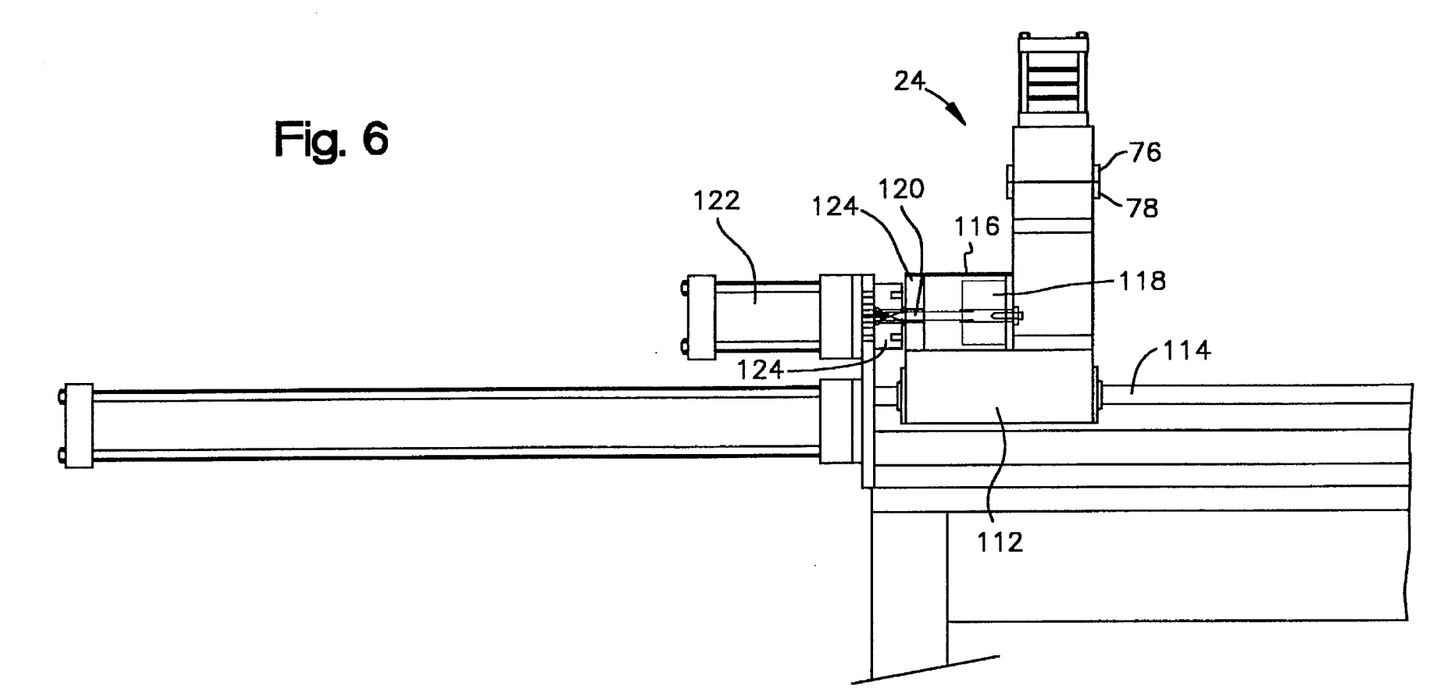
FIG. 6 is an elevational view of a tension clamp and an impact unit associated with that clamp.
Figure 7:
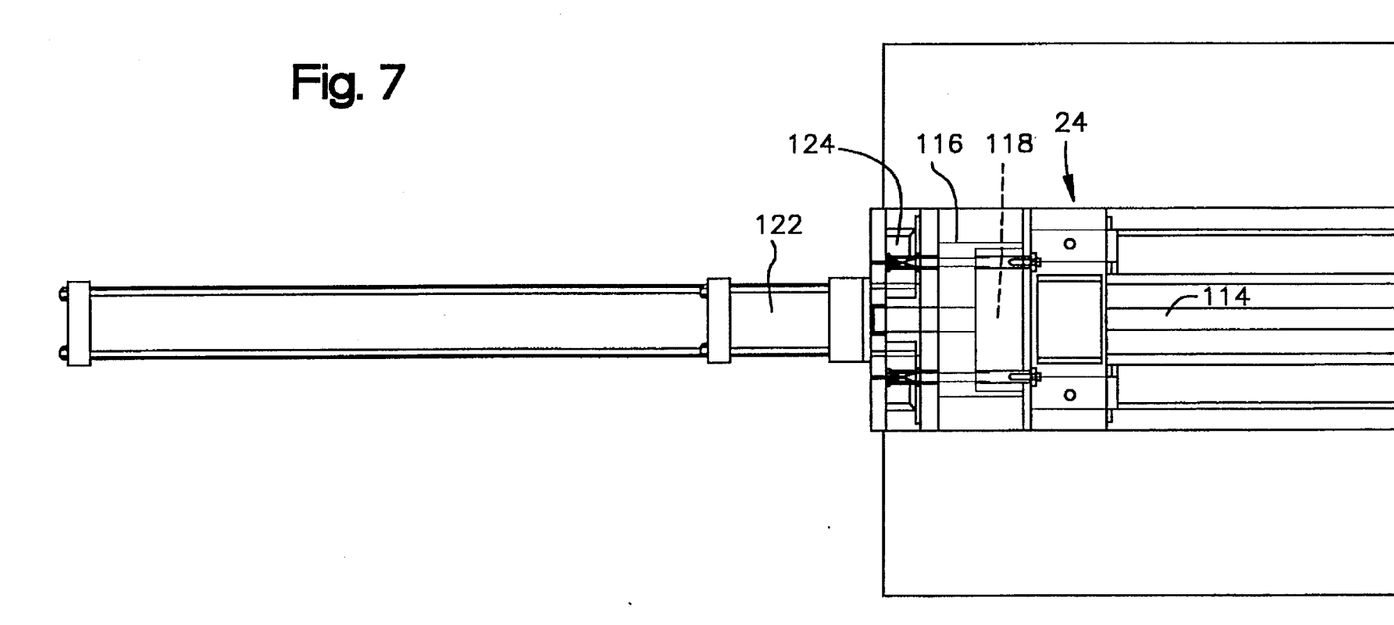
FIG. 7 is a plan view of the unit illustrated in FIG. 6.

After the tubing has been partially cut in this manner and while the clamping assemblies 20 and 24 retain their grip on the tubing, the tubing is completely parted in the following manner. Referring to FIGS. 6 and 7, the assembly 24 further includes a base 112. An anvil 118 is mounted within the cylinder 116 and is carried by a piston rod 120 which projects from a pneumatically operated power cylinder 122. Severing impact is applied to the tubing 34 by actuating the cylinder 122 to rapidly retract the piston rod 120 so that the anvil 118 strikes a wall 124 of the cylinder 116 to quickly move the entire assembly 24 to the left, as viewed in FIG. 5, and against a cushioning mechanism. The sharp impact on the assembly 24 fractures the walls 125 in a burr-free manner since the tubing is not able to elongate as it would if a steady tensile force were applied to the tubing. The assembly 24 releases the severed tubing, and the tubing is deposited on a collection table 130. The assembly 20 also releases its grip on the tubing, and the tubing is incrementally advanced through the assemblies 20, 22 and 24, so that the operation may be repeated.

While it is preferable to apply the above described impact force to the tubing to perform the final separating operation, normally applied tensile forces may be employed since necking down of the walls 124 will not significantly impede the flow of fluid through the tubing. Thus, the invention is not limited to the sudden application of tensile forces on the tubing.

Nor is the invention limited to the specific aspects of the preferred embodiment of the invention shown and described. It should be understood that various modifications and rearrangements of the parts may be resorted to without departing from the scope of the invention as disclosed and claimed herein.

What is claimed is:

1. A method of separating a length of hollow, thin-walled metal tubing into predetermined lengths having substantially burr-free parted ends comprising the steps of providing a length of hollow flat tubing having flat upper and lower walls joined by end walls, partially severing the tubing by providing relative movement between said tubing and opposed circular slitting blades and by completely severing the upper and lower walls of said tubing, said movement comprising rectilinear movement of said blades at a predetermined linear velocity in a direction generally parallel to the upper and lower walls and transverse to a longitudinal axis of said tubing and said movement further comprising simultaneous rotational movement of said blades at a predetermined angular velocity which exceeds said linear velocity, and completely severing the tubing by applying an axial force to said tubing sufficient to exceed the ultimate strength of said tubing.

2. A method according to claim 1, wherein said step of completely severing said tubing comprises the step of applying a high impact force along said longitudinal axis of said tubing.

\* \* \* \* \*